United States Patent [19]

Mason

[11] Patent Number: 4,640,015

[45] Date of Patent: Feb. 3, 1987

[54] MACPHERSON STRUT ALIGNMENT GAUGE AND STRAIGHTENING APPARATUS

[76] Inventor: James H. Mason, 785 Pittwater Road, Brookvale, New South Wales 2100, Australia

[21] Appl. No.: 684,103

[22] Filed: Dec. 20, 1984

[30] Foreign Application Priority Data

Dec. 20, 1983 [AU] Australia .............................. PG2918

[51] Int. Cl.$^4$ .............................................. G01B 3/38
[52] U.S. Cl. .......................... 33/181 AT; 33/180 AT; 33/203.18
[58] Field of Search ................ 33/203, 203.18, 203.12, 33/180 AT, 181 AT, 403, 530, 531, 532, 534, 538, 169 R, 170, 172 B, DIG. 2

[56] References Cited

U.S. PATENT DOCUMENTS 1,597,357 8/1926 Godfrey ............................ 33/534 X
3,528,178 9/1970 Kunzler ............................ 33/169 R
4,453,315 6/1984 Mosiman et al. .............. 33/181 AT

OTHER PUBLICATIONS

American Machinist, 3/44.

Primary Examiner—Harry N. Haroian
Attorney, Agent, or Firm—Marshall & Melhorn

[57] ABSTRACT

A gauge apparatus for measuring the displacement of components, particularly automotive components. The gauge includes a support member adapted for secure attachment to one component, such as an automotive wheel. A transverse gauge bar is slidably interengageable with the support member and carries a rotatable gauge member at one end for measuring the displacement of the gauge member with respect to the gauge bar. The apparatus can be used to check the alignment of Macpherson strut suspension systems as well as wheel castor, camber, toe-in and alignment. A Macpherson strut straightening apparatus is also disclosed.

11 Claims, 20 Drawing Figures

MACPHERSON STRUT ALIGNMENT GAUGE AND STRAIGHTENING APPARATUS

The present invention relates to apparatus for measuring and assisting in the alignment and repair of damaged structural members. It has particular relevance to the automotive industry, in particular to the alignment of wheels and to the measurement and repair of damaged Macpherson strut assemblies. It will be appreciated, however, that the invention is not limited to this particular application.

With increasing use of Macpherson strut suspension systems, there is a growing need for a simple and effective way of checking the alignment of the Macpherson strut with respect to the axle and to correct this alignment if it does not conform to specifications. Mis-alignment usually occurs as a result of accident damage.

Difficulties are also encountered in establishing the correct alignment of the rear wheel assembly with front wheel drive automobiles and other vehicles having independent rear wheel suspension. It is presently very difficult to check whether the rear wheels have their correct degree of toe-in and also that they are correctly in-track with the body. For example, they may be correctly aligned with respect to each other but their axis of symmetry may not be parallel with that of the chassis.

It is also important to be able to establish the toe-in of the front wheels, together with their correct camber and castor angles.

It is an object of the present invention to provide a gauge which can be used for checking the alignment of Macpherson strut assemblies and which also may be adapted for performing some or all of the measuring functions mentioned above.

It is an object of one preferred form of the invention to provide a straightening apparatus for Macpherson strut assemblies which is both simple and effective to use and which permits the alignment to be quickly checked during the straightening process.

According to one aspect of the invention there is provided gauge apparatus for measuring the displacement of first and second components, said apparatus comprising:

a support member adapted for secure attachment to said first component;

a transverse gauge bar slidably interengageable with said support member for relative movement along a predetermined path;

locking means for rigidly securing said transverse gauge bar to said support member at a pre-selected position along said path;

a gauge member rotatably secured to the distal end of said transverse gauge bar, said gauge member including indicia for measuring the angle of displacement of said gauge member with respect to said gauge bar.

Preferred embodiments of the invention will now be described, by way of example only, with reference to the accompanying drawings in which.

Figure 1:
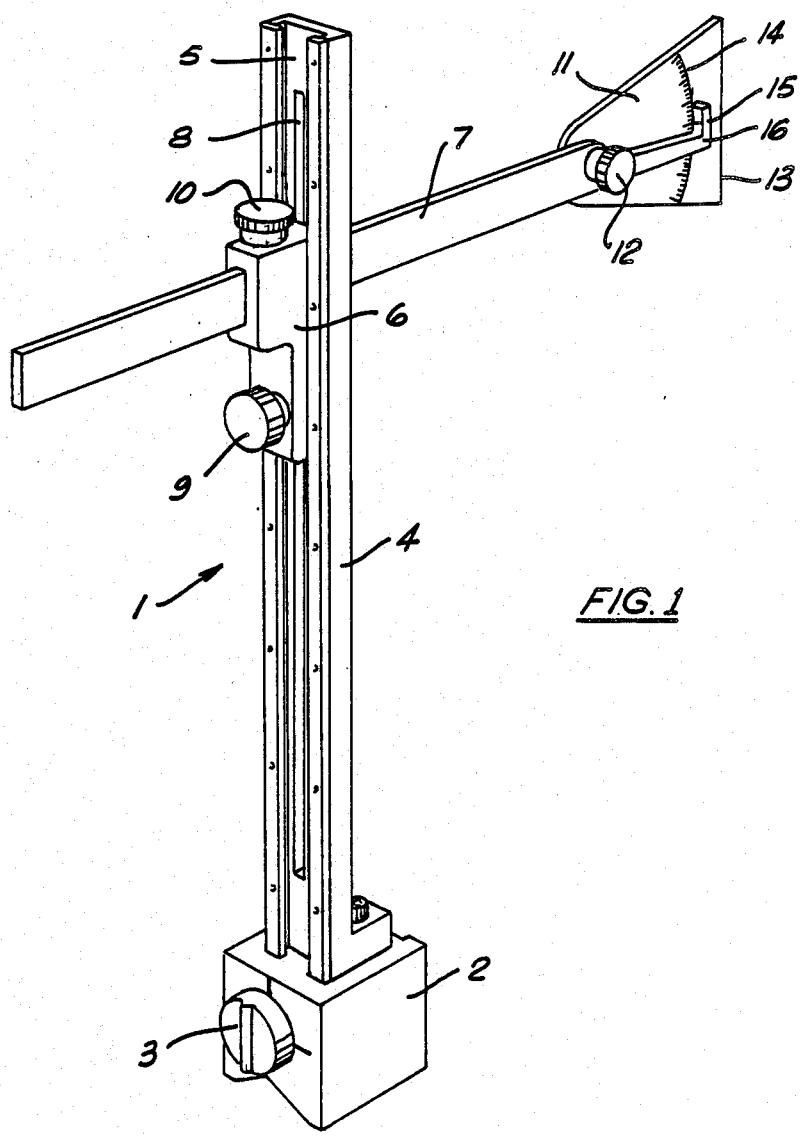
FIG. 1 is a perspective view of a gauge apparatus in accordance with one embodiment of the invention.
Figure 2:
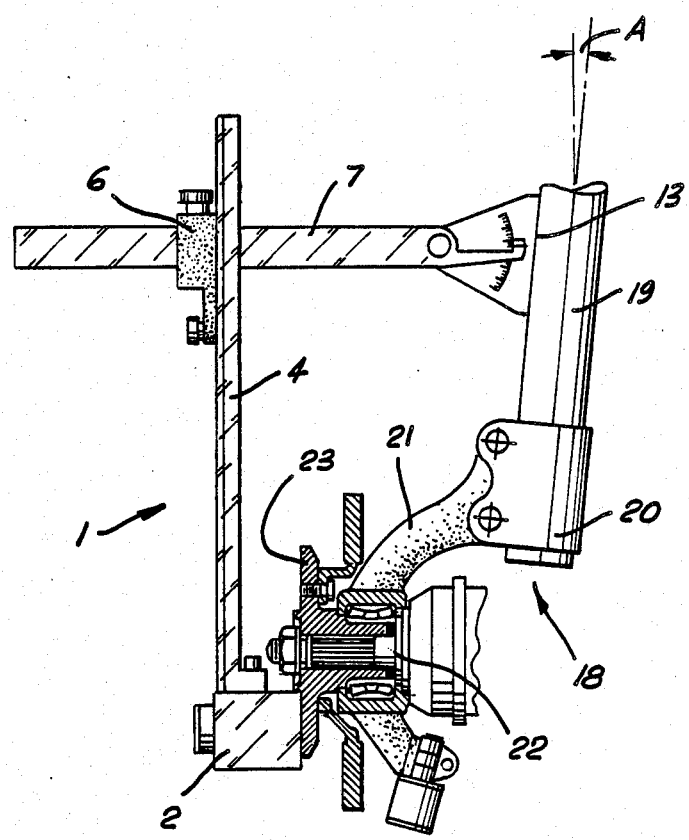
FIG. 2 is a partly sectioned end elevation showing the gauge applied to a Macpherson strut assembly.

Referring initially to FIGS. 1 and 2 of the drawings, gauge apparatus 1 includes a magnetic base block 2 which operates in a known manner by rotation of a locking knob 3. Attached to the base block is a support member having a guide channel 5 which captively engages a slidable carriage 6 which itself supports a transverse gauge bar 7. The gauge bar 7 extends through a vertical slot 8 formed in the support member 4 so as to permit vertical movement of the carriage 6 along the guide channel 5. The carriage 6 can be secured in any predetermined vertical position along the support member by locking screw 9. A similar locking screw 10 secures the gauge bar at any predetermined position with respect to the carriage 6.

A gauge member 11 is mounted to the gauge bar 7 for rotation about the axis of a locking screw 12. The gauge member 11 includes a straight edge 13 and the inclination of this edge 13 with respect to the gauge bar can be measured from a scale 14 on the gauge member by a pointer 15 located at the distal end 16 of the gauge bar. Conversely, the pointer may be located on the gauge member, with the scale appearing on the gauge bar. The locking screw 12 permits adjustment of the gauge member with respect to the gauge bar and enables it to be locked to the bar at any selected relative angular position.

The operation of the gauge apparatus is best shown in FIG. 2 which illustrates the gauge applied to a Macpherson strut axle assembly 18. The assembly 18 includes a Macpherson strut 19 secured at its lower end 20 to an axle support arm 21. The arm 21 supports an axle 22 which may be a drive axle or a fixed stub axle. The illustrated embodiment shows a front wheel drive unit with the wheel removed from the rotatable wheel support flange 23.

The gauge is applied to the Macpherson strut assembly by placing the base block 2 against the support flange 23. The locking knob 3 is then rotated to fix the base block magnetically to the support flange in known manner. The carriage 6 is then moved along the guide channel of the support member 4 and the gauge bar 7 extended to present the gauge member to the Macpherson strut 19 as shown. The gauge member is then rotated to bring the straight edge 13 into alignment and contact with the Macpherson strut by appropriate adjustment of the carriage and gauge bar. The three locking screws are then secured and the "steering alignment inclination" (SAI) angle "A" is measured from the protractor scale 14 by pointer 15. This angle can then be checked against the manufacturer's specifications.

Figure 3:
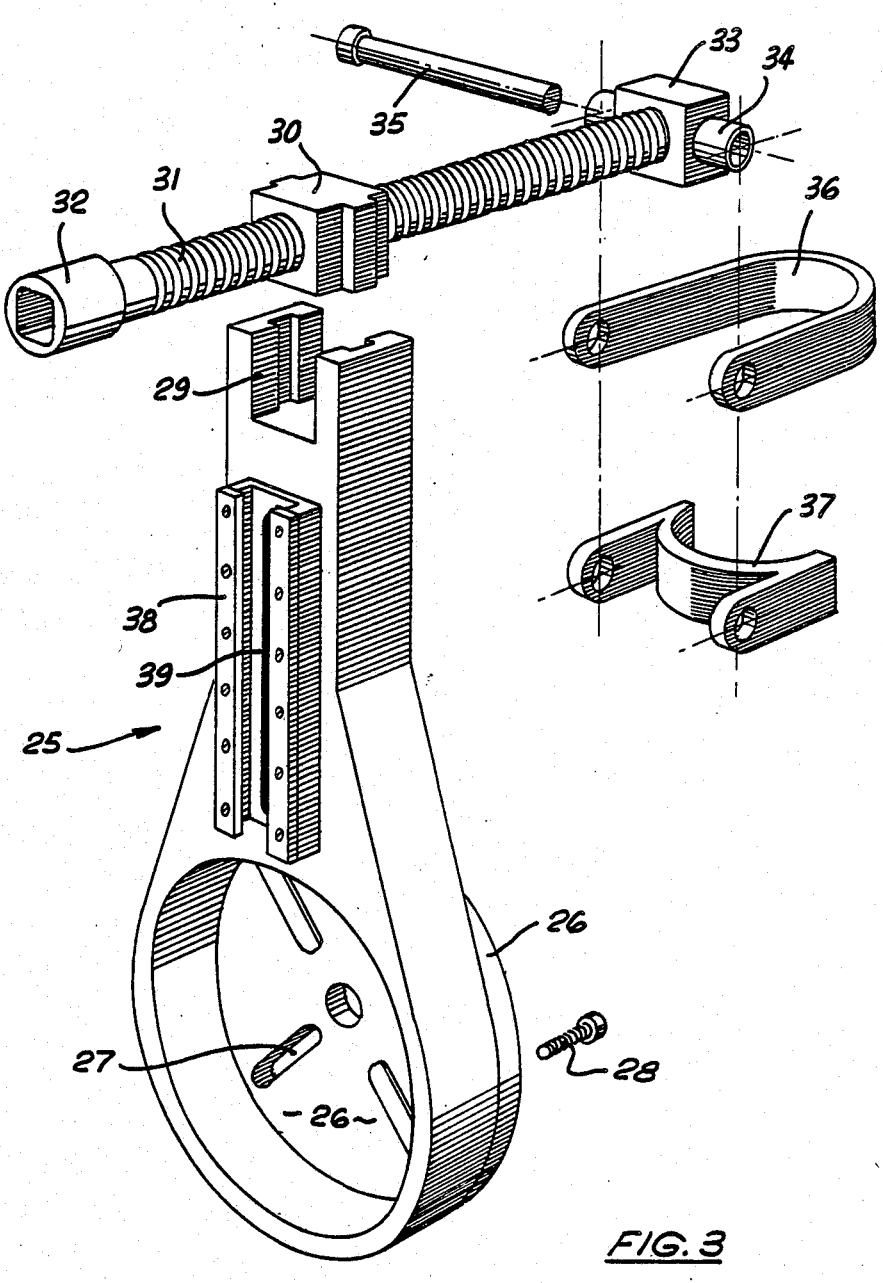
FIG. 3 is an exploded perspective view of a Macpherson strut straightening apparatus according to another embodiment of the invention.
Figure 4:
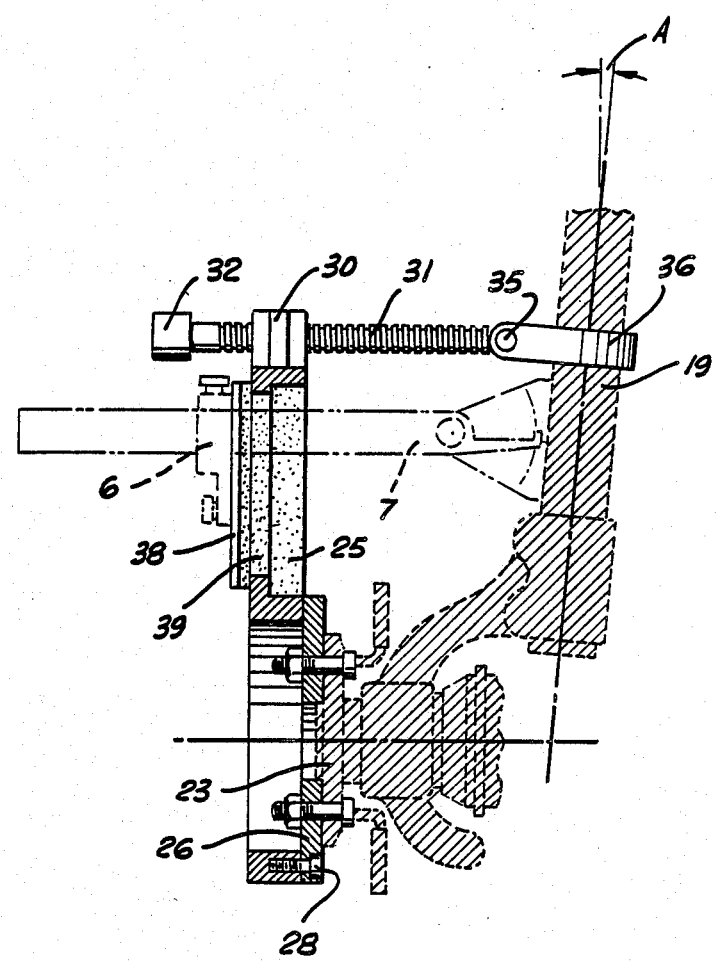
FIG. 4 is a partly sectioned end elevation similar to FIG. 2 but illustrating the straightening apparatus applied to the Macpherson strut assembly. The gauge apparatus is shown dotted.

If the inclination is found to be incorrect, the stub axle alignment may be corrected by means of the straightening apparatus illustrated in FIGS. 3 and 4. This apparatus includes a banjo post 25 incorporating a plate 26 by which the banjo post can be secured to the support flange 23. The plate is provided with appropriate holes or slots 27 to permit the banjo post to be securely bolted to the support flange by existing studs or bolts. Preferably, the plate 26 is interchangeable to suit the particular design of the support flange 23 by means of holding screws 28.

The upper end of the banjo post 25 includes a retaining socket 29 for accepting a thrust nut 30. Threadedly engaged with the thrust nut 30 is a lead screw 31 having a drive socket 32 located at one end and a trunion block 33 rotatably mounted at the other end. The trunion block 33 includes a horizontal sleeve bearing 34 for accepting a removable pin 35 which in turn rotatably supports either a pulling yoke 36 or a pushing yoke 37 depending on whether the required correction is positive or negative.

FIG. 4 illustrates the straightening apparatus applied to the Macpherson strut assembly so as to pull the strut outwards and so reduce the measured SAI angle. In this configuration the pulling yoke 36 is placed around the Macpherson strut and secured to the trunion block by pin 35. The thrust nut 30 is then slipped into the retaining socket 29 and a suitable lever (not shown) applied to the drive socket 32. Appropriate rotation of the lead screw applies outwardly directed bending force to the Macpherson strut to correct the angular mis-alignment.

The alignment of the strut can be checked at any stage during the straightening procedure by means of the gauge apparatus previously described. However, in its preferred form, the invention provides a particularly convenient means of checking the strut inclination. This is achieved by providing the banjo post with a vertical guide channel 38 in the same form as the guide channel 5 of the gauge previously described. The channel 38 and associated vertical slot 39 permits the carriage 6 and gauge bar 7 to be applied directly to the banjo post 25 as shown in the dotted lines in FIG. 4. The gauge can then be used in the same manner as described above but with the vertical guide channel 38 on the banjo post functioning in the same manner as the guide channel 5 previously described.

For determining the desired inclination of the Macpherson strut, the correct steering alignment inclination angle can be set by rotating and locking the gauge member. The gauge bar is then positioned slightly back from the strut. This permits the operator to monitor the required inclination while bending the Macpherson strut until it is approximately in alignment with the straight edge 13 on the gauge member 11. Upon releasing the bending tension, the exact inclination can be checked by simply moving the gauge bar forward until the straight edge 13 contacts the Macpherson strut. Minor adjustments can be made to the strut until the straight edge makes accurate contact with the Macpherson strut at the predetermined SAI angle. The apparatus is then removed.

The straightening apparatus functions in essentially the same manner if the SAI angle is to be increased, except that the pulling yoke 36 is replaced with the pushing yoke 37. This permits bending force to be applied to the Macpherson strut in the opposite sense to that described above. In this instance, the pre-set gauge member can be brought into initial contact with the strut at the upper end of the straight edge 13. Inwardly directed pushing force is then applied by rotating the lead screw in the opposite sense to that described above until the strut comes into alignment with the straight edge 13. The exact alignment can be checked at any stage as previously described.

Alternative embodiments of the invention are illustrated in FIGS. 5 to 20 where corresponding features have been given corresponding reference numerals for ease of description. These embodiments permit a number of different measurements to be made.

Figure 5:
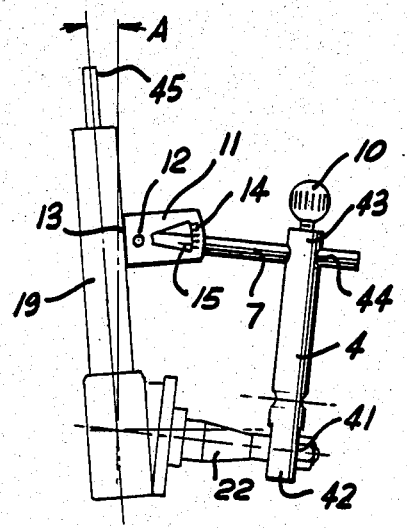
FIG. 5 is a view similar to FIG. 2 but illustrating on a smaller scale another embodiment of the gauge apparatus applied to a Macpherson strut assembly.
Figure 6:
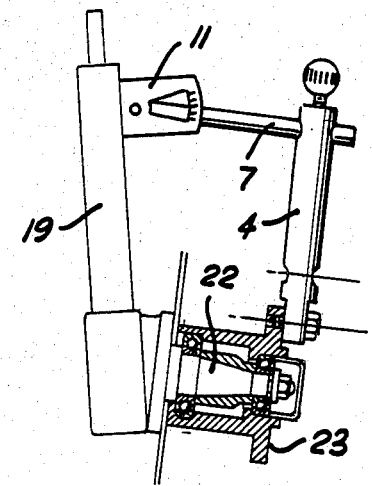
FIG. 6 is a view similar to FIG. 5 but illustrates a different method of attaching the gauge apparatus.

Referring initially to FIG. 5, the gauge apparatus includes a support member 4 provided with a transverse hole 41 at one end 42 for direct attachment to a stub axle 22 as shown. The support member may also be attached to the wheel support flange 23 as shown in FIG. 6 by a separate bolt or by engagement with a projecting stud.

Figure 13:
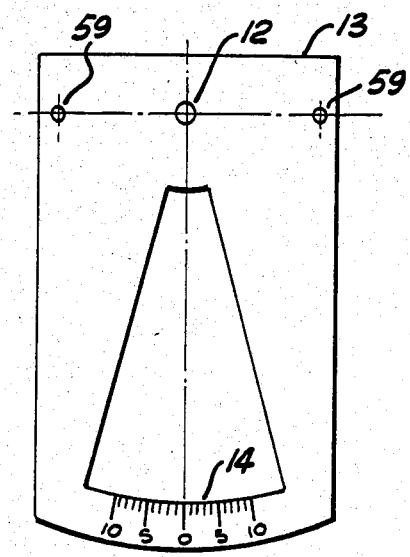
FIGS. 13, 14 and 15 are enlarged views of gauge members suitable for use with the invention.

The other end 43 of the support member 4 is provided with another transverse hole 44 for sliding engagement with a transverse gauge bar 7. The gauge bar can be locked to the support member in any desired position by means of a locking screw 10. A gauge member 11 is rotatably secured to the distal end of the gauge bar 7. As best shown in FIG. 13, the gauge member 11 includes a straight edge 13 for presentation to the Macpherson strut 19 as previously described and illustrated. The desired height adjustment of the gauge bar can be achieved by rotation of the support flange and corresponding rotation of the support member and the gauge bar. The operation of the embodiment illustrated in FIGS. 5 and 6 is essentially the same as that already described in relation to FIGS. 1 and 2.

Figure 7:
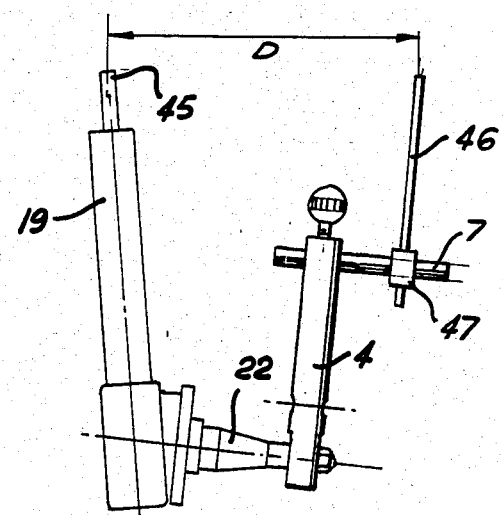
FIG. 7 is a view similar to FIG. 5 showing the addition of an extension bar to measure the displacement of the top of the Macpherson strut.
Figure 8:
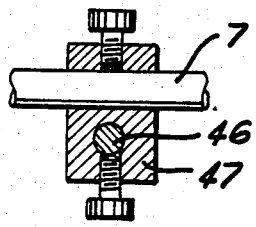
FIG. 8 is an enlarged sectional view of a connector for use in the embodiment of FIG. 7.

In order to check the displacement "D" of the top 45 of the Macpherson strut 19, the FIG. 5 embodiment is provided with an extension bar 46 and connector 47 as shown in FIG. 7. The connector is illustrated in FIG. 8 and permits the distance D to be measured and compared for both front wheel assemblies.

Figure 9:
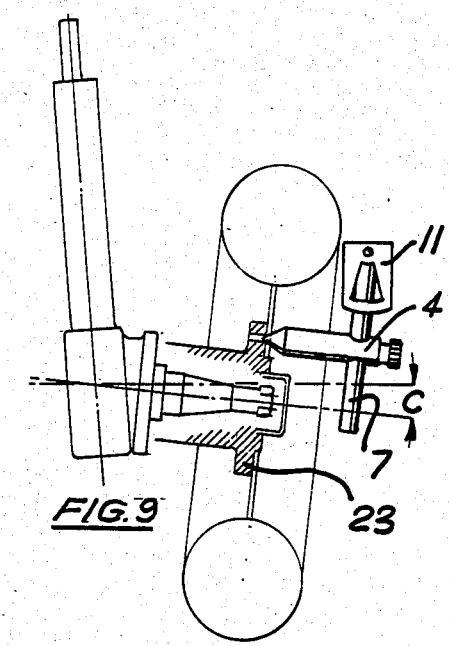
FIG. 9 is a view similar to FIG. 5 but illustrates a further embodiment of the invention applied to measure the camber angle of a front wheel.
Figure 10:
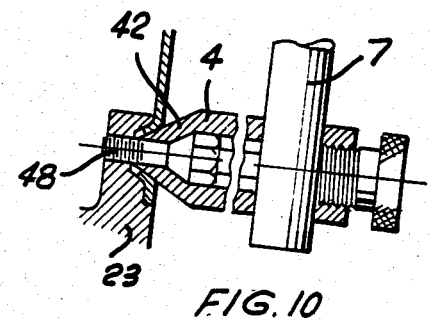
FIG. 10 is an enlarged partly sectioned view showing part of the gauge member of FIG. 9.
Figure 11:
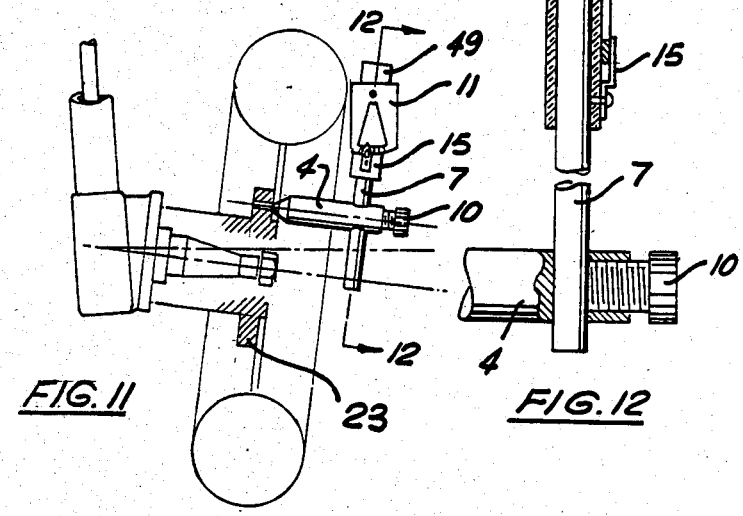
FIG. 11 is similar to FIG. 9 but illustrates another embodiment of the invention applied to measuring the castor angle of a wheel.

FIGS. 9 and 10 illustrate an alternative form of support member where one end 42 is tapered and provided with a projecting threaded portion 48 which permits the support member to engage a hole in the wheel support flange 23 when the wheel is in position as shown in FIGS. 9 and 11. The tapered end may alternatively be provided with a threaded hole for engagement with a stud on the wheel support flange. With the gauge apparatus applied as illustrated in FIG. 8, the camber angle C can be measured directly with the free-swinging gauge member operating by gravity.

Figure 12:
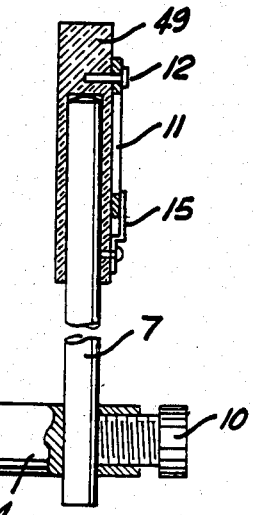
FIG. 12 is an enlarged, partly sectioned view of the gauge apparatus shown in FIG. 11.

Another embodiment illustrated in FIGS. 11 and 12 permits the castor angle to be determined. In this embodiment the gauge member is rotatably mounted by a pin 12 to a gauge support 49 which is itself mounted for adjustable rotation about the gauge bar 7. The castor angle is determined geometrically in known manner by taking one reading from the gauge member and then rotating the wheel through approximately twenty degrees when viewed in plan. At the completion of this rotation the gauge support 49 is rotated about the gauge bar axis, permitting the gauge member to rotate under the influence of gravity to give the second angular reading from which the castor angle can be geometrically determined.

Figure 17:
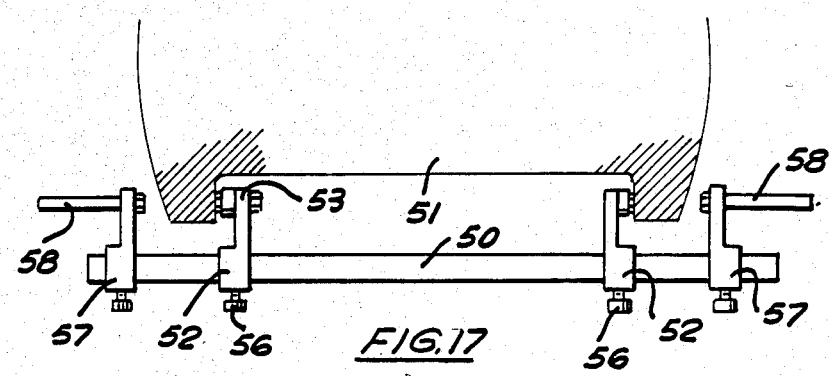
FIG. 17 is an end elevation of a datum bar assembly for checking rear wheel alignment.
Figure 18:
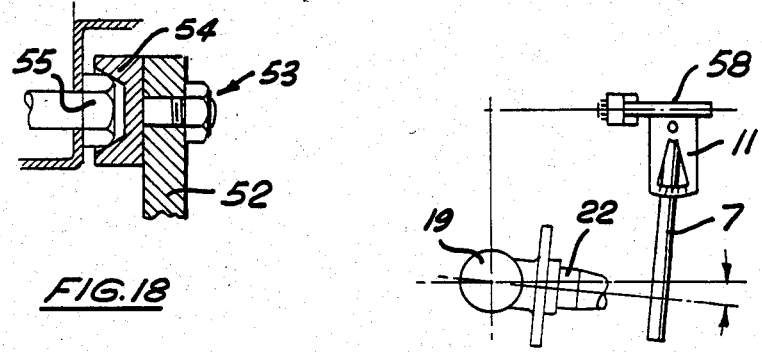
FIG. 18 is an enlarged view of part of the attachment means for the datum bar shown in FIG. 17.
Figure 19:
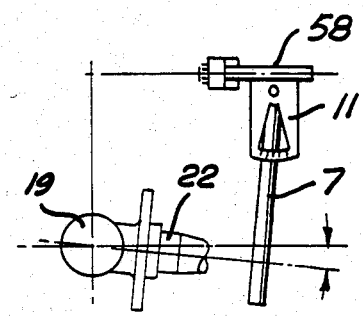
FIG. 19 is a plan view illustrating the gauge apparatus of FIG. 9 used in conjunction with the datum bar of FIG. 17 for checking rear wheel alignment.

FIGS. 17, 18 and 19 illustrate the use of the invention to check the alignment of the rear wheels. As shown in FIG. 17, a datum bar 50 is secured transversely beneath a vehicle 51 by means of a pair of slidable and lockable banjo hangers 52. Each hanger 52 includes an attachment portion 53 as best shown in FIG. 18. The attachment portion 53 includes an outwardly opening tapered socket 54 for engagement with a projecting bolt head 55, nut or other formation on the chassis. The two hangers can then be secured in position on the datum bar by grub screws 56, thereby rigidly connecting the datum bar to the chassis. A pair of adjustable extension pieces 57 are slideably engageable with the datum bar to provide a conveniently accessible transverse reference bar 58. The gauge apparatus of the invention is then connected to the rear wheel in the same manner as shown in FIGS. 9 and 11 but with the gauge member lying in a horizontal plane as shown in FIG. 19. Presentation of the gauge member straight edge 13 to the reference bar 58 enables the alignment of the rear wheel to be measured as shown.

Figure 20:
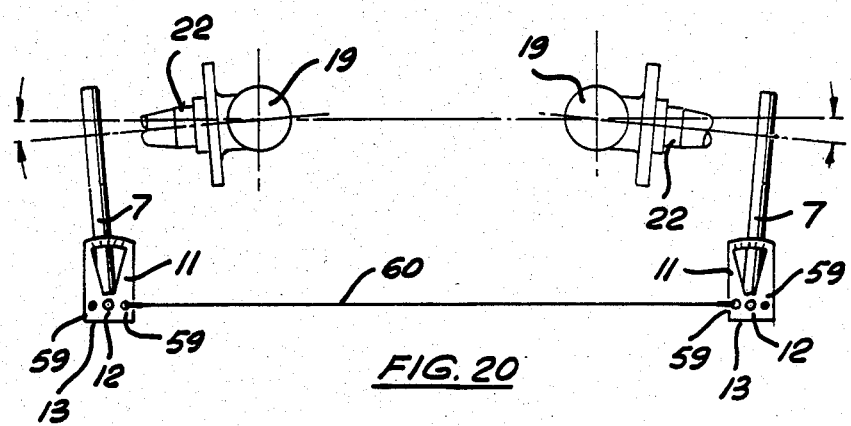
FIG. 20 is a plan view showing the use of the gauge apparatus of FIG. 19 modified to check the toe-in of a front wheel assembly.

The invention can also be used to determine the toe-in of the front wheel assembly as illustrated in FIG. 20. In this embodiment, each gauge member includes a pair of holes 59 or other attachment means for securing a resilient cord 60 between a pair of gauge apparatus each secured to its respective front wheel in the same manner previously described in relation to FIG. 19 and as shown in a vertical plane in FIG. 11. The holes 59 are aligned with the gauge member rotation axis 12 and are parallel to the straight edge 13 such that inward tension of the resilient cord permits the toe-in to be accurately determined.

Figure 14:
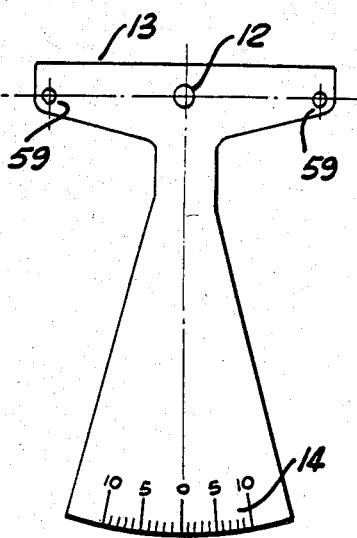
Figure 15:
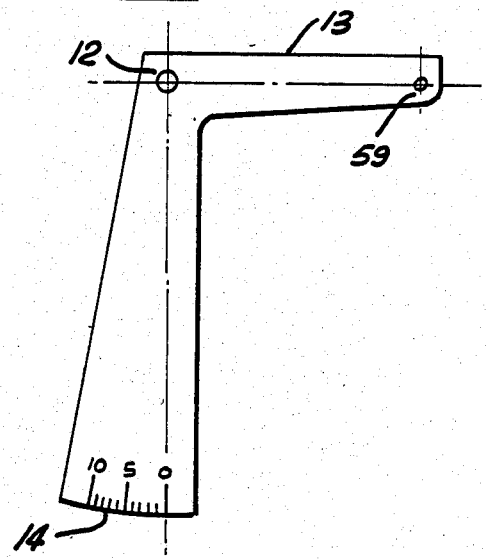

Different forms of gauge member are illustrated in FIGS. 13, 14 and 15. Desirably, the distance from the gauge member axis of rotation 12 to the attachment points 59 of the resilient cord should be as large as possible.

Figure 16:
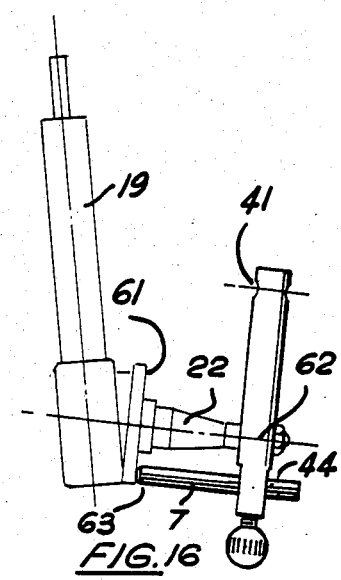
FIG. 16 illustrates the gauge of FIG. 5 used to check the alignment of a stub axle with the stub axle flange.

FIG. 16 illustrates the application of the gauge apparatus for checking the alignment of the stub axle 22 with respect to the stub axle flange 61. In this embodiment a third transverse hole 62 is provided in the support member 4 for mounting it to the stub axle as shown. The free end 63 of the gauge bar 7 can then be used to check the squareness of the stub axle with respect to the axle flange 61 as the support member is rotated.

Although the invention has been described with reference to specific examples, it will be appreciated that the invention may be embodied in many other forms.

I claim:

1. Gauge apparatus for measuring the displacement of first and second components, said apparatus comprising:

a support member adapted to secure attachment to the first component, said member including an elongate bar having one end adapted for attachment to the first component, said one end including a threaded portion projecting coaxially from the one end of said support member, thereby being able to engage a complimentary threaded hole in a wheel support flange;

a transverse gauge bar;

means for slidably interengaging said gauge bar to the elongate bar of said support member to provide for selectable relative movement of said gauge bar along a predetermined path on said support member;

locking means for rigidly securing said transverse gauge bar to said support member at a pre-selected position along said path; and a gauge member rotatably secured to the distal end of said transverse gauge bar, said gauge member including indicia for measuring the angle of displacement of said gauge member with respect to said gauge bar.

2. Gauge apparatus according to claim 1 wherein said locking means comprises a locking screw engageable with said gauge bar.

3. Gauge apparatus according to claim 1 wherein the one end of said support member is tapered and said threaded portion projects from said tapered end.

4. Gauge apparatus according to claim 1 wherein said support member includes a transverse hole intermediate its ends for rotatable engagement with a stub axle shaft.

5. Gauge apparatus according to claim 1 wherein said gauge member is rotatably mounted to a gauge support which is itself mounted for adjustable rotation about said gauge bar.

6. Gauge apparatus according to claim 1 wherein said gauge member includes a straight edge able to be aligned with a portion of said second component.

7. Gauge apparatus according to claim 1 wherein said gauge member includes means spaced from its axis of rotation for engagement with resilient means extending between symetrically disposed gauge apparatus for interconnecting their respective gauge members, thereby to determine front wheel toe-in when each apparatus is fixedly located with respect to its respective stub axle.

8. Gauge apparatus according to claim 1 further including:

an elongate datum bar;

attachment means for engaging said datum bar to the underneath of a vehicle, horizontally and perpendicular to the longitudinal axis of said vehicle;

such that securement of said gauge apparatus to a rear wheel permits measurement of the angular displacement of said wheel with respect to said datum bar.

9. Gauge apparatus according to claim 8 wherein said datum bar includes at least one extension piece slidably mounted to said datum bar to which said gauge member may be presented.

10. Gauge apparatus according to claim 8 wherein said attachment means comprises a pair of banjo hangers, each including a banjo portion adapted to adjustably clampingly engage said datum bar and an attachment portion adapted to engage a formation on the underneath of said vehicle.

11. Gauge apparatus according to claim 10 wherein said attachment portion includes an outwardly directed tapered socket adapted for engagement with a projecting formation on the underneath of said vehicle.

* * * * *